United States Patent
Bayen et al.

(10) Patent No.: US 10,404,815 B2
(45) Date of Patent: Sep. 3, 2019

(54) SYSTEMS AND METHODS FOR ESTIMATING USER ATTENTION

(71) Applicant: Facebook, Inc., Menlo Park, CA (US)

(72) Inventors: Zoe Abrams Bayen, Mountain View, CA (US); Siyang Chen, Sunnyvale, CA (US); Jordan William Frank, Seattle, WA (US); Aleksander Gorajek, San Jose, CA (US); Walid Krichene, Berkeley, CA (US); Itamar Rosenn, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 299 days.

(21) Appl. No.: 14/086,896

(22) Filed: Nov. 21, 2013

(65) Prior Publication Data
US 2015/0142954 A1    May 21, 2015

(51) Int. Cl.
*H04L 29/08* (2006.01)

(52) U.S. Cl.
CPC ................................... *H04L 67/22* (2013.01)

(58) Field of Classification Search
CPC ... H04L 29/08072; H04L 29/06; H04L 43/00; H04L 41/22
See application file for complete search history.

(56) References Cited

U.S. PATENT DOCUMENTS

| 7,020,690 B1* | 3/2006 | Haitsuka | H04L 67/24 709/217 |
| 7,711,662 B2* | 5/2010 | Buscema | G06N 3/0454 706/13 |
| 8,063,872 B2* | 11/2011 | Forstall | G06F 1/3203 345/102 |
| 2002/0163905 A1* | 11/2002 | Brabrand | A63H 30/04 370/347 |
| 2003/0152076 A1* | 8/2003 | Lee | G06F 9/3885 370/389 |
| 2004/0003042 A1* | 1/2004 | Horvitz | G06Q 10/109 709/204 |
| 2004/0155854 A1* | 8/2004 | Ma | G06F 1/3203 345/102 |
| 2005/0021485 A1* | 1/2005 | Nodelman | G06Q 10/109 706/21 |
| 2005/0021612 A1* | 1/2005 | Shuster | G06Q 30/0264 709/203 |
| 2005/0257139 A1* | 11/2005 | Burst | G06Q 10/06 715/234 |
| 2006/0080321 A1* | 4/2006 | Horn | G06F 17/30867 |

(Continued)

*Primary Examiner* — Joshua Joo
(74) *Attorney, Agent, or Firm* — Sheppard Mullin Richter & Hampton LLP

(57) ABSTRACT

Techniques for estimating user attention on a website or application are provided. First activity data for a first user of a website or an application may be identified. The first activity data may indicate activities of the first user on the website or the application. A first predetermined period of inactivity may be detected in the first activity data. A response triggering event may be initiated after the first predetermined period of inactivity. An indication of a user response to the response triggering event may be monitored for. Whether the first user is passively present on the website or the application may be determined based on the monitoring for the indication of the user response.

20 Claims, 7 Drawing Sheets

(56) References Cited

U.S. PATENT DOCUMENTS

| | | | |
|---|---|---|---|
| 2007/0043605 A1* | 2/2007 | Fisher | G06Q 10/109 |
| | | | 705/30 |
| 2007/0130097 A1* | 6/2007 | Andreev | G06F 11/3447 |
| | | | 706/46 |
| 2007/0180122 A1* | 8/2007 | Barrett | H04L 67/14 |
| | | | 709/227 |
| 2009/0070412 A1* | 3/2009 | D'Angelo | G06Q 10/10 |
| | | | 709/203 |
| 2010/0251118 A1* | 9/2010 | Peterson | G06F 9/453 |
| | | | 715/710 |
| 2012/0036181 A1* | 2/2012 | Isidore | G06Q 50/01 |
| | | | 709/203 |
| 2012/0150941 A1* | 6/2012 | Goldman | G06F 9/4443 |
| | | | 709/203 |
| 2012/0276885 A1* | 11/2012 | Bacelli | H04B 1/0475 |
| | | | 455/418 |
| 2013/0061251 A1* | 3/2013 | Schwartz, Jr. | G06F 9/4812 |
| | | | 719/320 |
| 2016/0232355 A1* | 8/2016 | Li | G06F 21/6245 |

* cited by examiner

SYSTEMS AND METHODS FOR ESTIMATING USER ATTENTION

FIELD OF THE INVENTION

The present disclosure relates to the field of monitoring user engagement and, in particular, estimating user attention on a website or application.

BACKGROUND

A social networking system may support a website to enable its users, such as persons or organizations, to interact with each other. With input from a user, the social networking system may create and store a user profile associated with the user. The user profile may include demographic information, communication-channel information, information about personal interests, as well as other types of information about a user. The social networking system may also create and store a record of relationships of the user with other users of the social networking system, as well as provide services (e.g. timeline, posts, photo-sharing, event organization, messaging, games, or advertisements) to facilitate social interaction between or among users.

The social networking system may choose to analyze the engagement of users with a website associated with the social networking system. Such analysis may provide insights regarding actual use of the website and may inform attempts to optimize the design and operation of the website for the benefit of users. For example, if a certain type of content of the website is especially popular with some or all users, then the social networking system may choose to increase the provision of such content to accommodate user preferences. As another example, if a certain type of page of the website garners little attention from users, then the social networking system may choose to reduce or eliminate the instances of such pages in favor of other content deemed more desirable. Optimization of the website in this manner allows the website to foster interaction and communication among users and thereby fulfill its role as an important social networking resource.

SUMMARY

To estimate user attention on a website or application, computer implemented methods, systems, and computer readable media, in an embodiment, may identify first activity data for a first user of a website or an application. The first activity data may indicate activities of the first user on the website or the application. A first predetermined period of inactivity may be detected in the first activity data. A response triggering event may be initiated after the first predetermined period of inactivity. An indication of a user response to the response triggering event may be monitored for. Whether the first user is passively present on the website or the application may be determined based on the monitoring for the indication of the user response.

In an embodiment, the first user may be determined to be present on the website or the application when the indication of the user response is detected within a threshold time period for response.

In an embodiment, the first user may be determined to be passively present on the website or the application at a time when the response triggering event is initiated.

In an embodiment, the first user may be determined to be absent from the website or the application when the indication of the user response is not detected within a threshold time period for response.

In an embodiment, the first user may be determined to be absent from the website or the application at a time when the response triggering event is initiated.

In an embodiment, whether the first user is determined to be passively present on the website or the application may be logged.

In an embodiment, contextual information associated with the logging may be logged.

In an embodiment, the contextual information may include one or more of the following: a page of the website or the application the first user was visiting, a browser on which the website or the application was run, and an operating system of a device on which the website or the application was run.

In an embodiment, the contextual information may include one or more of the following: a type of client device, a time of day or week, and demographic information.

In an embodiment, the response triggering event may be a dimming of the website or the application.

In an embodiment, the response triggering event may be a displaying of a request for the first user to confirm whether the user is present on the website or the application.

In an embodiment, a model to predict whether users are passively present on the website or the application may be trained based on the determining whether the first user is passively present.

In an embodiment, the model may be a regression model.

In an embodiment, the model may be a threshold model.

In an embodiment, second activity data for a second user may be identified. The second activity data indicates activities of the second user on the website or the application. A first interval of inactivity may be detected in the second activity data. A prediction of whether the second user is passively present on the website or the application during the first interval of inactivity may be generated based on the model. A time the second user is passively present on the website or the application during the first interval of inactivity may be estimated based on the prediction.

In an embodiment, the prediction may be a probability.

In an embodiment, a total time the second user is determined to be on the website or the application may include the time the second user is passively present on the website or the application during the first interval of inactivity, and a time the second user is determined to be actively present on the website or the application.

In an embodiment, the computer system may include a server associated with a social networking system.

Many other features and embodiments of the invention will be apparent from the accompanying drawings and from the following detailed description.

Figure 1:
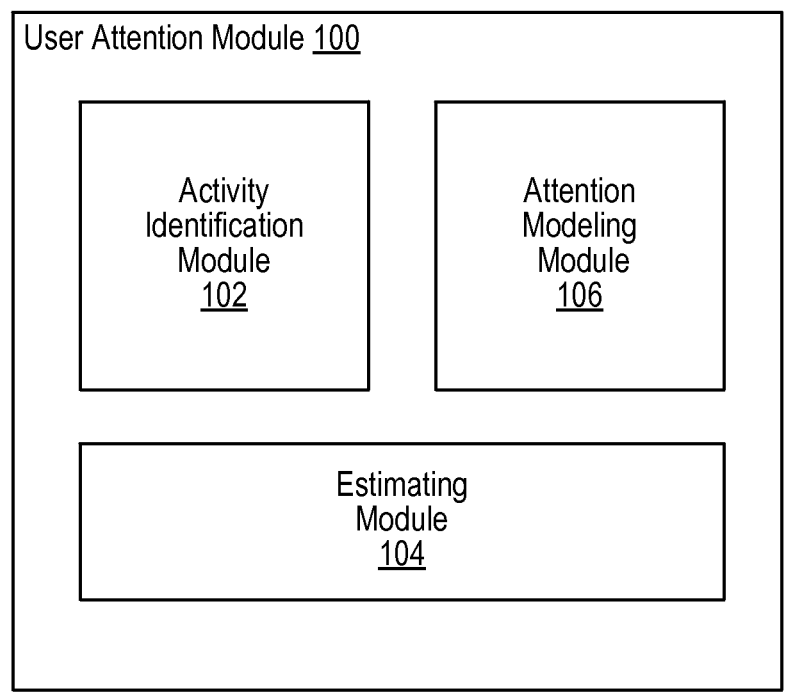
FIG. 1 illustrates an example user attention module, according to an embodiment.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Measurements regarding user engagement with a website or application may be beneficial for the owner of the website or application. The term "website" is used broadly herein and may include a single webpage, multiple webpages, etc. The term "application" is used broadly herein and may include an application for a desktop computer, a mobile application for mobile devices, etc. For the sake of clarity and brevity, examples and descriptions herein may only refer to a website. However, it should be appreciated an application may also be applicable.

Measurements about user engagement with a website may be obtained and used for a variety of business purposes. For example, user engagement may play a role in how much revenue may be obtained for the website. As another example, user engagement may also factor into product related decisions, such as the design, development, and operation of a website.

A social networking system is an example of an organization that may own or support a website for which user engagement is important. User engagement measurements may relate to a variety of considerations, such as how much time users spend on the social networking system's website; how the users spend their time when on the website; how often users are actively using the website; etc. A social networking system may have a large user base constituting millions and even billions of users. The magnitude of the user base can make the user engagement measurements even more vital to analyzing and optimizing operation of the website supported by the social networking system. Furthermore, user engagement measurements as they relate to different types of platforms may also be important to inform the design, development, and optimization of a social networking website. For example, it may be useful to understand how user engagement on a social networking system's mobile application differs from user engagement on the social networking system's website. It may also be useful to understand how user engagement differs among applications (e.g., mobile web applications, native applications) running on various mobile operating systems, such as Android, iOS, etc.

User engagement with a website may be based on the time when the user's attention is on the website (or when the user is "present" on the website). When the user's attention is on the website, the user may be considered either "actively present" or "passively present". Active presence (or when the user is actively present) may include physical user interaction with the website. For example, active presence may reflect physical action constituting user input applied to a client device (e.g., mobile phone, laptop computer, desktop computer, tablet, etc.) that can be used to indicate that the user's attention is on the website. Passive presence (or when the user is passively present) may include user interaction with the website that does not reflect physical action constituting user input applied the client device. In other words, passive presence may involve the user's paying attention to the website but not providing any physical input to the client device. Examples of when the user is passively present may include, but are not limited to, the user reading content on the website, the user viewing an image on the website, the user experiencing multimedia on the website, etc.

When the user is not paying attention to the website, the user may be referred to herein as "absent" from the website. For example, a user may be considered absent from a particular website when the user is viewing or interacting with a different website, no longer operating the client device, or otherwise no longer paying attention to the particular website.

Providing an accurate estimation of how long the user's attention is on a website may be affected by the ability to predict when the user is passively present on the website versus being absent from the website. In an embodiment, a model may be implemented to predict when a user is passively present on a website. The model may be trained based on training data acquired from a sample population to learn when users are passively present on the website. Systems and methods of the present disclosure may relate to training a model, or using a trained model, to estimate when users are passively present on a website.

FIG. 1 illustrates an example user attention module, according to an embodiment. A user attention module 100 includes an activity identification module 102, an estimating module 104, and an attention modeling module 106. The components shown in this figure and all figures herein are exemplary only, and other implementations may include additional, fewer, or different components. Some components may not be shown so as not to obscure relevant details. The user attention module 100 may estimate how much time a user's attention is on a website. The user attention module 100 may distinguish between the user being actively present and the user being passively present. A determination of active user presence may be based on detection of physical user input applied to a client device, which can be used to infer that the user's attention is on the website.

The activity identification module 102 may identify user activities that may indicate that the user is actively present on the website. The user activities may include physical user input applied to a client device that indicates that the user's attention is on the website. The user activities may include a user swipe, scroll, press of a button, movement of a mouse, touch of a touchscreen, etc. on the client device in relation to the website. The user activities may also include subsequent events that are generated in response to physical user input applied to the client device. For example, physical user input may generate automatic responses by the website or associated operating system. For example, when a user scrolls a page of the website, a scrolling event call in accordance with an operating system of the client device may be detected as a response to user activity that indicates that the user is actively present on the website. The activity identification module 102 may selectively determine which user activities are to be identified as indicating that the user is actively present. For example, in some instances, a "focus" event may be determined to infer that the user' attention is on the website. A focus event may include a user activating a non-active page, tab, or window of a website. For example, a website may include multiple tabs on a page, with only one tab active at a time. By clicking on a non-active tab, the user may activate the non-active tab. The activation of the non-active tab may constitute a focus event.

In an embodiment, the activity identification module 102 may receive activity data including recorded user activities. The activity data may be formatted as a data structure, such as a bit array. The bit array may be associated with a start time for the first bit in the array. The bit array may include a recorded sequence of "1"s and "0"s at consecutive predetermined time intervals, where each bit value of "1" or "0" may represent either a detection or non-detection of an activity, respectively, at the respective time interval. In one embodiment, the time interval may be one second. In such case, at every consecutive second, either a bit value of "1" or "0" may be recorded based on whether user activity was detected or not detected, respectively. In other embodiments, the time interval may be 2 seconds, 3 seconds, 5 seconds, or any other suitable time increment.

The size of the bit array may vary in different embodiments. In one embodiment, the bit array may include a sequence of 64 bits. In other embodiments, the bit array may include a sequence of 32 bits, 128 bits, 256 bits, or any other suitable number of bits. The user activity for a user may be recorded within one or more bit arrays.

In an embodiment, the activity identification module 102 may monitor (or detect) user activity of a user. For example, the activity identification module 102 may monitor any user activities for a user in real time. In an embodiment, the activity identification module 102 may monitor information about user activities received at a server in communication with the client device, such as server requests.

The estimating module 104 may estimate the total time that a user's attention is on a website. For example, the total time may be estimated as the time the user is actively present on the website plus the time that the user is passively present on the website. The estimating module 104 may estimate the time the user is actively present based on the user activity identified by the activity identification module 102. For instance, the time corresponding to the "1"s in a bit array may be counted as time when the user is actively present.

When the user is not actively present, the user may be passively present on the website or absent from the website. The estimating module 104 may estimate the time that the user is passively present. In an embodiment, the estimating module 104 may estimate the time the user is passively present based on a prediction as to whether the user is passively present. This prediction may be provided to the estimating module 104 when no user activity is indicated in the activity data, such as where a "0" is recorded in the bit array. For example, when the estimating module 104 detects a "0" in the bit array, the estimating module 104 may initiate a query for a prediction of whether the user is passively present at the time corresponding to the "0" in the bit array. The estimating module 104 may obtain the prediction of the user being passively present from the attention modeling module 106, as described in further detail herein. In addition to the query for a prediction, the estimating module 104 may provide the attention modeling module 106 with input data, which is described in further detail herein.

The prediction may be provided in various forms, such as a probability, score, metric, etc. In an embodiment, the probability that is generated for an interval of inactivity may translate to a time estimate that is a fraction of the time interval. For example, for a time interval of 1 second, a 50% probability that the user is passively present may generate a time estimate of ½ a second (50% of the 1 second time interval) to denote the time the user is passively present. Similarly, for a time interval of 1 second, a 75% probability that the user is passively present may generate a time estimate of ¾ second (75% of the 1 second time interval) to denote the time the user is passively present. The time estimate may vary accordingly based on other probabilities and other lengths of time intervals. In some instances, the time estimate may include no time for a 0% probability, or 1 second for a 100% probability. Similarly, scores or metrics reflecting the time a user is passively present may be generated that similarly can be converted to time estimates. For example, a range of scores of 0 to 100 may be used to compute a respective time estimate range from no time (i.e., zero seconds) to the entire duration of the applicable time interval (e.g., 1 second). It should be appreciated that other conversion techniques or formulas may be implemented in other embodiments. In one embodiment, the prediction that the user is passively present is binary (e.g., 0% or 100%), such that the user is determined to be passively present for the entire time interval or completely absent for the entire time interval. Other embodiments may have more complicated conversion techniques or formulas to convert predictions to corresponding time estimates to denote the time the user is passively present.

The attention modeling module 106 provides a prediction that the user is passively present based on a trained model, such as a model based on machine learning or artificial intelligence. The model may be, for example, a software program, software function, algorithm, or any other suitable functionality or tool that can be used to determine or predict the behavior of the user. In an embodiment, the model may provide a prediction of whether the user is passively present when the user is not actively present.

Figure 2A:
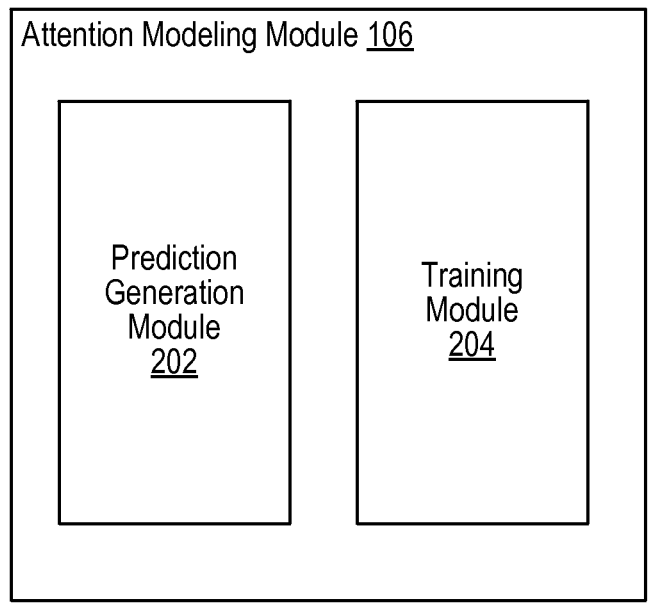
FIG. 2A illustrates an example attention modeling module, according to an embodiment.

FIG. 2A illustrates an example attention modeling module 106, according to an embodiment. The attention modeling module 106 includes a prediction generation module 202 and a training module 204.

The prediction generation module 202 generates a prediction that the user is passively present based on a trained model. The prediction may be generated for times when the user is not actively present. For example, the estimating module 104 may query the prediction generation module 202 when there is no user activity detected or identified, such as where "0"s are recorded in the bit array of the activity data.

The prediction generation module 202 may receive input data to be used in the prediction computation. The input data may include the time since the last recorded user activity. In other embodiments, the input data may include other timing data, such as the duration of the last period of user activity. Further details are provided in connection with an example bit array in FIG. 2B.

In an embodiment, the input data further may include contextual information related to the user's interaction with the website. The contextual information may be provided for some or all intervals of time within the bit array. Example contextual information may include data related to the page of the website the user was visiting; the browser that was being used by the user; the type of client device that was being used by the user; the time of day or week, or other time segment during which the user interaction was occurring; demographic information of the user; etc. The input data may include any combination of different types of contextual information.

The data related to the page may include, for example, a high level identification of the page type, such as newsfeed, photos, timeline, etc. In an embodiment, the data for the page type may include more detailed information beyond what page is accessed. For example, the data for the page type may include a script path, or program code that was executed to render a page, which may identify more specific information as to what the user was doing on the application or website during the interval of user attention. The data related to the page the user was visiting may also include more granular data for the website, such as which tabs or sections of a page that are active or otherwise selected by the user when on the page. The data related to the page the user was visiting may also include navigation information, such as a sequence of pages that the user previously has accessed. The data related to the page may be provided in the form of an identifier (e.g., code or value).

The data related to the type of client device may include, for example, whether a mobile device or a desktop computer is being used, which operating system (e.g., iOS, Android OS, etc.) is being used; etc. Other types of contextual information may also be included in other embodiments. In one embodiment, the contextual information may include at least the data for the page the user was visiting, the browser that was being used, and the operating system that was being used.

The prediction generation module 202 may receive the input data from the estimating module 104 and generate a prediction for times corresponding to an absence of user activity. The prediction generation module 202 may generate the prediction based on the input data that is provided by the estimating module 104. Various parameters of the model may be determined based on training data (or ground truth data) collected from a sample population, such as described in further detail herein. Once the parameters are determined, the parameters may be implemented in the prediction generation module 202 to generate a "trained model". The trained model may then be used (e.g., in production or in normal operation of the website) to predict whether a user is passively present at times where no user activity is shown for the user.

The training module 204 may determine various parameters of the model based on training data that is collected. For example, in an embodiment, the training module 204 may determine the coefficient values of a logistic regression model or linear regression model based on the training data collected. Other classes of models may also be implemented in different embodiments, and the parameters of those models may be determined based on the training data that is collected.

Figure 2B:
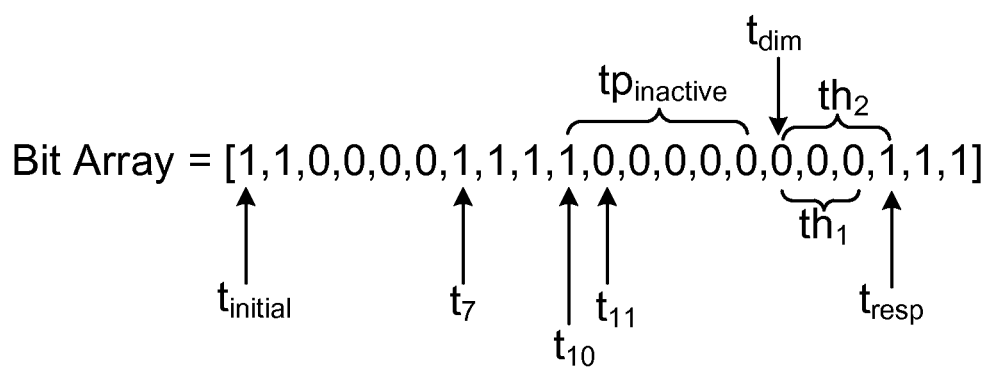
FIG. 2B illustrates an example bit array of activity data, according to an embodiment

FIG. 2B illustrates an example bit array of activity data, according to an embodiment. As shown, the bit array includes a sequence of "1"s and "0"s at intervals of 1 second. Each bit is provided for each second from a starting time, $t_{initial}$. A "1" represents the detection of user activity at a corresponding interval, and a "0" represents no detection of user activity at a corresponding interval. In the example shown, user activity is recorded for the first two seconds from the starting time, $t_{initial}$; no user activity is recorded for the next 4 seconds; user activity is recorded for the next 4 seconds; no user activity is recorded for the next 8 seconds, and user activity is detected for the next 3 seconds. At time, $t_{11}$, no user activity is detected and the time since the last recorded user activity (i.e., time $t_{10}$) is 1 second. The duration of the last period of user activity is 4 seconds (i.e., time $t_7$ to time $t_{10}$). Further details shown in FIG. 2B may be discussed in connection with FIG. 3.

Figure 3:
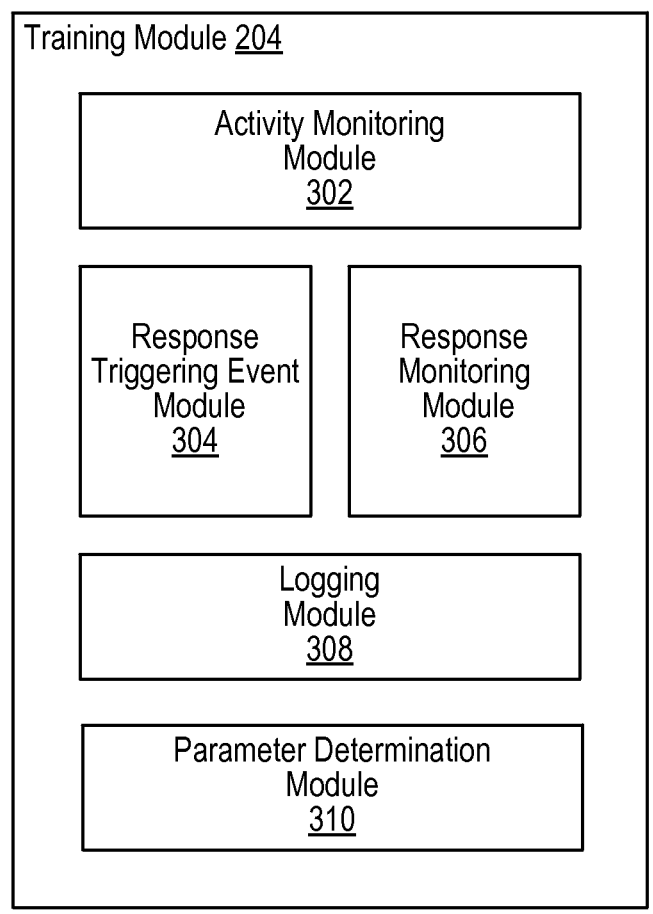
FIG. 3 illustrates an example training module 204, according to an embodiment.

FIG. 3 illustrates an example training module 204, according to an embodiment. The training module 204 includes an activity monitoring module 302, a response triggering event module 304, a response monitoring module 306, a logging module 308, and a parameter determination module 310.

The training module 204 may monitor for user activities generated from a user on the website. A response triggering event may be initiated by the training module 204 at a time when no user activity is detected and the user is determined to not be actively present. The response triggering event may be generated to trigger a user response. A determination may be made as to whether the user is passively present based on the user response or lack of a user response. In an embodiment, a user response may be required within a threshold time period in order to determine that the user is passively present. The training module 204 may collect the data related to the user response, or lack thereof, and use it to learn when users are passively present on a website. The data may be collected for a sample population and used as the basis to train a model to predict when a user is passively present on a website.

The attributes of the sample population may vary in different embodiments. For example, the size of the sample population may vary. While any number of users may constitute the sample population, in some embodiments, the sample population is 5000 users or less, such as 500 users or less. In an embodiment, the sample population may be a subset of the population that is monitored by the activity identification module 102. In an embodiment, the sample population that is used to train the model varies over time. For example, the sample population may comprise 400 users at a time, with a new 400 users selected on a daily basis. The new size of the sample population, or the frequency with which the new population is selected, may also vary. In some instances, the sample population may be rotated on a non-periodic basis, such as randomly.

The activity monitoring module 302 may monitor the user activity of the sample population. The user activities that may be monitored may be the same as the user activities described for the activity identification module 102. The activity monitoring module 302 may record any detected user activities of a user in a bit array. The format of the bit array may be similar to the bit array described for the activity identification module 102. For example, the bit array may include a sequence of "1"s and "0"s at a time interval, with a "1" representing a detected user activity at a corresponding time interval (e.g., second) and a "0" representing no detected user activity at a corresponding time interval.

The response triggering event module 304 may initiate an event that is used to trigger a response from the user. For example, in an embodiment, a command may be communicated from a server to a client device to initiate the event on the client device. The response triggering event may be triggered during a time where no user activity is detected in order to determine if the user may be passively present. In an embodiment, the response triggering event may be initiated after a predetermined period of inactivity, such as 10 seconds, 5 seconds, 2 seconds, or any other selected period of inactivity. In an embodiment, the predetermined period of inactivity may change over time. Furthermore, the predetermined period of inactivity may be selected in various manners. For example, in an embodiment, the predetermined period of inactivity may be a random value that is picked from an exponential distribution. In this way, for instance, relatively shorter time periods may have a higher probability of being selected than relatively longer time periods. Varying the predetermined period of inactivity may enable more diverse data to be collected and used to train the model.

In an embodiment, the response triggering event may be a dimming of the website. The dimming of the website, as initiated by the response triggering module 304, is intended to cause the user to undim the website if the user is passively present on the website. The user may be able to undim the website in one or more manners, such as by touching the screen, pressing a button or keypad, moving the mouse, etc. The undimming of the website may be indicate that the attention of the user is directed at the website and accordingly that the user is passively present instead of absent.

Various degrees of dimming may be implemented in different embodiments. For example, in one embodiment, a high level of dimming may be implemented, which provides for a low visual transparency to the website that significantly impedes the user's ability to view the website. A higher level of dimming of the website may make the user more apt to undim the website when the user is passively present.

In another embodiment, a low level of dimming may be implemented, which provides for a higher visual transparency to the web page and less significantly impedes the user's ability to view the website. In certain circumstances, a low level of dimming may better determine whether the user is passively present as compared to a high level of dimming. In this regard, a high level of dimming of a particular website may capture the attention of the user and prompt the user to take action, such as undimming the website, even when the user's attention may be focused away from the particular website. A low level of dimming of the website may capture the attention of the user when the user is focused on the particular website and may avoid unintentionally capturing the user's attention when the user is focused elsewhere (i.e., false positives). In this way, an optimal level of dimming, and any user response thereto, may more reliably indicate whether a user is passively present with respect to a website.

For example, the user's attention may be on one or more windows for other websites, browsers, or applications different from the window of the website of concern that is dimmed. If the dimming of the website of concern is at a high level, then it may be significant enough to divert the eye of the user from the other website, browser, or application to the website of concern and cause her to undim the website. However, when the user is not focused on the website of concern, dimming the website of concern at a low level may be less likely to unintentionally capture the user's attention to cause her to undim the website.

In an embodiment, more than one level of dimming may be implemented at different times. For example, the response triggering event module 304 may initiate a high level dimming of the website at certain times and a low level dimming of the website at other times. In this way, for instance, more diverse data may be collected and used to provide a more accurate training model.

Other types of response triggering events may be implemented in other embodiments. For example, a response triggering event may include a message box or window that is displayed in front of the website. The message may, for instance, ask or instruct the user to confirm that the user is still there (or on the website) by clicking a confirmation button on the message box or by some other method of confirmation such as touching the screen, moving the mouse, pressing the keypad, etc. In yet another embodiment, the response triggering event may include an obstructing element (e.g., an opaque window, icon, picture, etc.) that is displayed over the website to obstruct all or part of the website until the user performs some action to remove the obstructing element. Various combinations of response triggering events may be implemented in different embodiments.

The response monitoring module 306 may monitor for indications that the user has responded to the response triggering event. In an embodiment, the time of the initiation of the response triggering event may coincide with a time of inactivity. If a user response is detected (e.g., the user undims the website), then it may be determined that the user was passively present at some time or certain intervals during the time of inactivity. In an embodiment, if a user response is detected, then it may be determined that the user was passively present at the time the response triggering event was initiated. In other embodiments, if a user response is detected, then it may be determined that the user was passively present from a time of the last activity until the time the response triggering event was initiated, or from a time of the last activity until the time the response was detected, or for any other time or certain interval during the time of inactivity.

If a user response is not detected (e.g., the user does not undim the website), then it may be determined that the user was absent from the website during the time of inactivity. In an embodiment, if a user response is not detected, then it may be determined that the user was absent from the website at the time the response triggering event was initiated. In other embodiments, if a user response is not detected, then it may be determined that the user was absent from the website from a time of the last activity until the time the response triggering event was initiated, or from a time of the last activity until the time the response was detected, or for any other time or certain interval during the time of inactivity.

In an embodiment, a threshold time period for response may be implemented. If the user responds to the response triggering event within the threshold time period, then the user may be considered passively present during the time of inactivity (e.g., at the time the response triggering event was initiated). If the user does not respond to the response triggering within the threshold time period, then it may be determined that the user was absent from the website during the time of inactivity (e.g., at the time the response triggering event was initiated). The length of the threshold time period may vary in different embodiments. The length of the threshold time period may be selected in different manners, such as through experiments to determine the average time it takes a user to react to such a response triggering event when the user is passively present. In an embodiment, the length of the threshold response period may be 10 seconds or less, such as 5 seconds or less, or any other suitable duration.

As an example, at time $t_{10}$ shown in FIG. 2B, a "1" was recorded to indicate that user activity was detected. At the next second, $t_{11}$, no user activity was detected and hence a "0" was recorded. A predetermined period of inactivity, $tp_{inactive}$, is shown as 5 seconds long. After the duration of the predetermined period of inactivity, a response triggering event (e.g., dimming of the website) may be initiated, as represented at time, $t_{dim}$. If the user responds at time, $t_{resp}$, then the user response is 3 seconds after the response triggering event was initiated. If the threshold time period for response was 2 seconds, as represented by time period $th_1$, then no user response was detected within the threshold time period and it may be determined that the user was absent from the website during the predetermined period of inactivity $tp_{inactive}$. However, if the threshold time period for response was 3 seconds, as represented by time period $th_2$, then the user response was detected within the threshold time period and it may be determined that the user was passively present on the website during the predetermined period of inactivity $tp_{inactive}$. In some embodiments, the user may be determined to be passively present at a specific interval of time during the period of inactivity. For example, in one embodiment, the user may be determined to be passively present at the time, $t_{dim}$, when the response triggering event was initiated.

The logging module 308 may log training data, which may be used to train the model. Each determination of whether or not the user is passively present or absent may be logged by the logging module 308. In an embodiment, the logging module 308 may also log contextual information for each determination that is logged. The contextual information may be the same as the type of contextual information described for the prediction generation module 202. The contextual information may be collected for the user activities monitored by the response monitoring module 306. The logging module 308 may also log additional data, such as the activity data generated by the activity monitoring module 302, or any data related thereto. For instance, the bit array generated by the activity monitoring module 302 may be logged, the type of response triggering event that was initiated may be logged, the time the response triggering event was initiated may be logged, the time that it took the user to respond may be logged, the predetermined period of inactivity may be logged, threshold response period may be logged, etc.

The parameter determination module 310 may receive the training data logged by the logging module 308. The training data may be used to determine the parameters of the model. Once the parameters are determined, the parameters may be implemented in the prediction generation module 202. The "trained model" may then be used in production (or in normal operation of the website) to predict whether a user is passively present at times where no user activity is shown for the user.

Various types of models may be used in different embodiments. For example, a threshold model may be implemented in an embodiment. The threshold model may determine that a user is passively present if the user has been inactive for less than a predetermined time period. Under the threshold model, if the user is inactive for the predetermined time period or longer, then the user may be considered as absent from the website. The training data may be used to determine the value of the predetermined time period. In an embodiment, the predetermined time period may be the same value for all users. In another embodiment, the predetermined time period may vary based on input data that is associated with the user, such as the contextual information described herein. Other example types of models may include, but are not limited to, logistic regression, linear regression, regression trees, etc. The parameters of these models may be determined based on the training data. The resulting trained model may then be used for subsequent users and a determination about their passive presence or absence during normal operation of the website.

Figure 4:
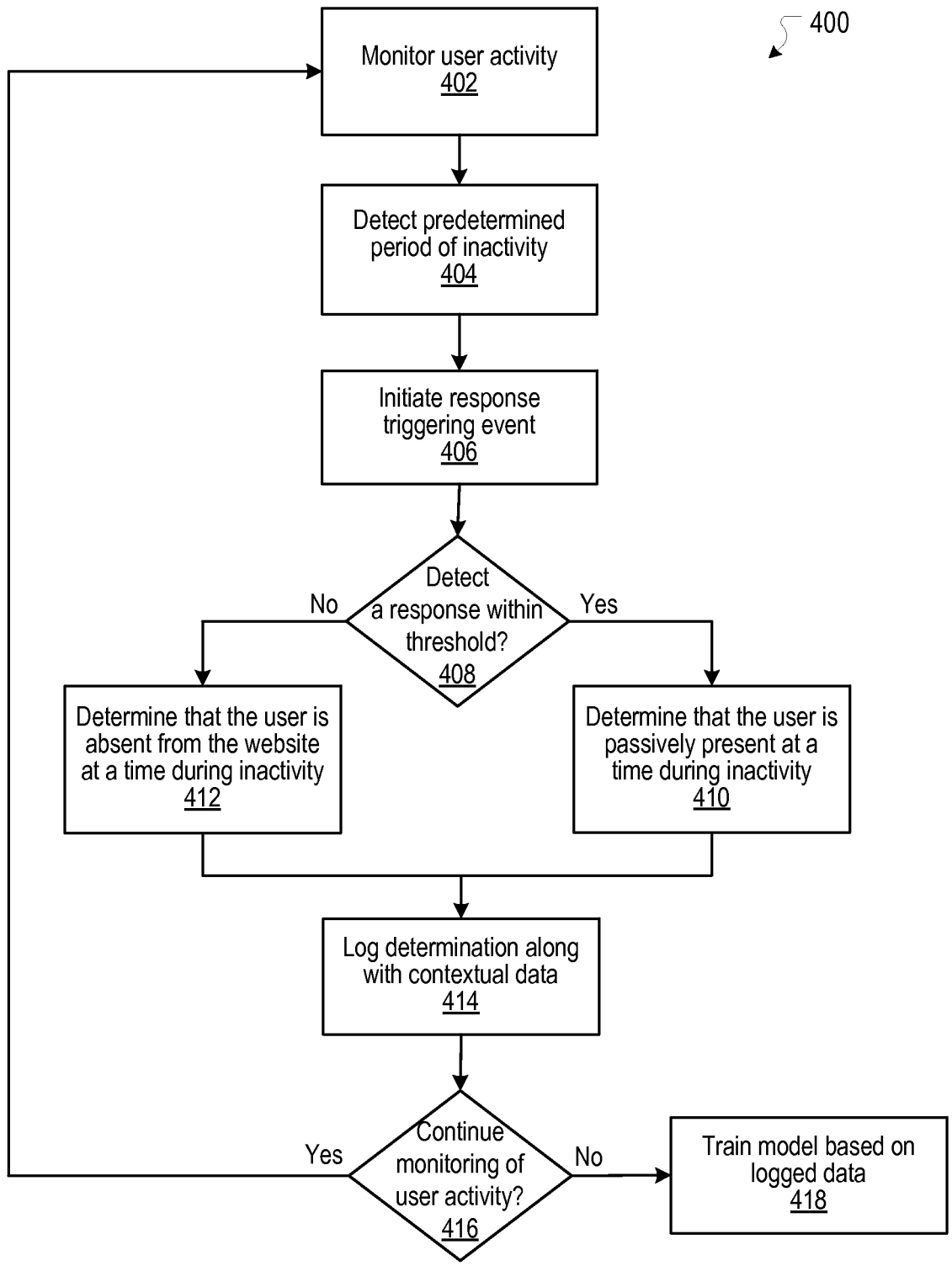
FIG. 4 illustrates an example method for collecting training data for training a model, according to an embodiment.

FIG. 4 illustrates an example method for collecting training data for training a model, according to an embodiment. It should be appreciated that the discussion above for FIGS. 1-3 may also apply to the discussion of FIG. 4. For the sake of brevity and clarity, every feature and function applicable to FIG. 4 is not repeated here.

At block 402 of method 400, user activity for a user on a website is monitored. The user activity may be the same as the types of user activity described herein. The user activity may be recorded as a data structure, such as a bit array with bits recorded at a time interval, such as every second. A "1" in the bit array may represent detected user activity of the user on the website at a corresponding time interval. A "0" in the bit array may represent no detected user activity of the user on the website at a corresponding time interval. In an embodiment, block 402 may be performed by the activity monitoring module 302 of FIG. 3.

At block 404, a predetermined period of inactivity is detected. The length of the predetermined period of inactivity may vary in different embodiments. In an embodiment, the predetermined period of inactivity may be a random value that is selected from an exponential distribution.

At block 406, a response triggering event is initiated after the duration of the predetermined period of inactivity. In an embodiment, the response triggering event may include a dimming of the website. The dimming of the website is intended to prompt the user to provide a response, such as undimming the website if the user is passively present on the website. Other types of response triggering events may be implemented in other embodiments. For example, a response triggering event may include displaying a message box or window that asks or instructs the user to confirm that the user is still on the website. The user may then confirm by one or more techniques, such as clicking on a button on the message box, touching the screen, moving the mouse, pressing the keypad, etc. In an embodiment, blocks 404 and 406 may be performed by the response triggering event module 304 of FIG. 3.

At block 408, it is determined whether a response by the user is detected within a threshold time period for response. The length of the threshold response period may vary in different embodiments.

At block 410, when a user response (e.g., the user undims the website) is detected within the threshold time period for response, then it may be determined that the user was passively present during the time of inactivity. In an embodiment, if a user response is detected, then it may be determined that the user was passively present at the time the response triggering event was initiated.

At block 412, when a user response is not detected within the threshold time period for response, then it may be determined that the user was absent from the website during the time of inactivity. In an embodiment, if a user response is not detected within the threshold time period for response, then it may be determined that the user was absent from the website at the time the response triggering event was initiated. In an embodiment, blocks 408, 410, and 412 may be performed by the response monitoring module 306 of FIG. 3.

At block 414, the determination made at block 410 or block 412 may be logged or otherwise recorded. Contextual information associated with each determination may also be logged. The contextual information may include the same type of contextual information as described herein, such as data related to the page of the website the user was visiting; the browser that was being used by the user; the type of client device that was being used by the user; the time of day or week, or other time segment during which the user interaction was occurring; demographic information of the user; etc. Additional data, such as the activity data generated for the user or any data related thereto, may also be logged as described herein. In an embodiment, block 414 may be performed by the logging module 308 of FIG. 3.

At block 416, it may be determined whether the monitoring of user activity is to continue. For example, if more user activity is to be monitored for a user, then the process may be repeated, as represented by the arrow from block 416 to block 402. As another example, the process may be repeated for other users within the sample population. When there is no more user activity to be monitored, then at block 418, the logged data (e.g., determinations made at block 410 or 412, associated contextual information, etc.) may be used to train the model. Example types of models may include, but are not limited to, threshold model, logistic regression, linear regression, regression trees, etc. In an embodiment, block 416 may be performed by the parameter determination module 310 of FIG. 3. The resulting trained model may then be implemented in the prediction generation model 202 of FIG. 2, for instance, and used for subsequent users during normal operation of the website.

Figure 5:
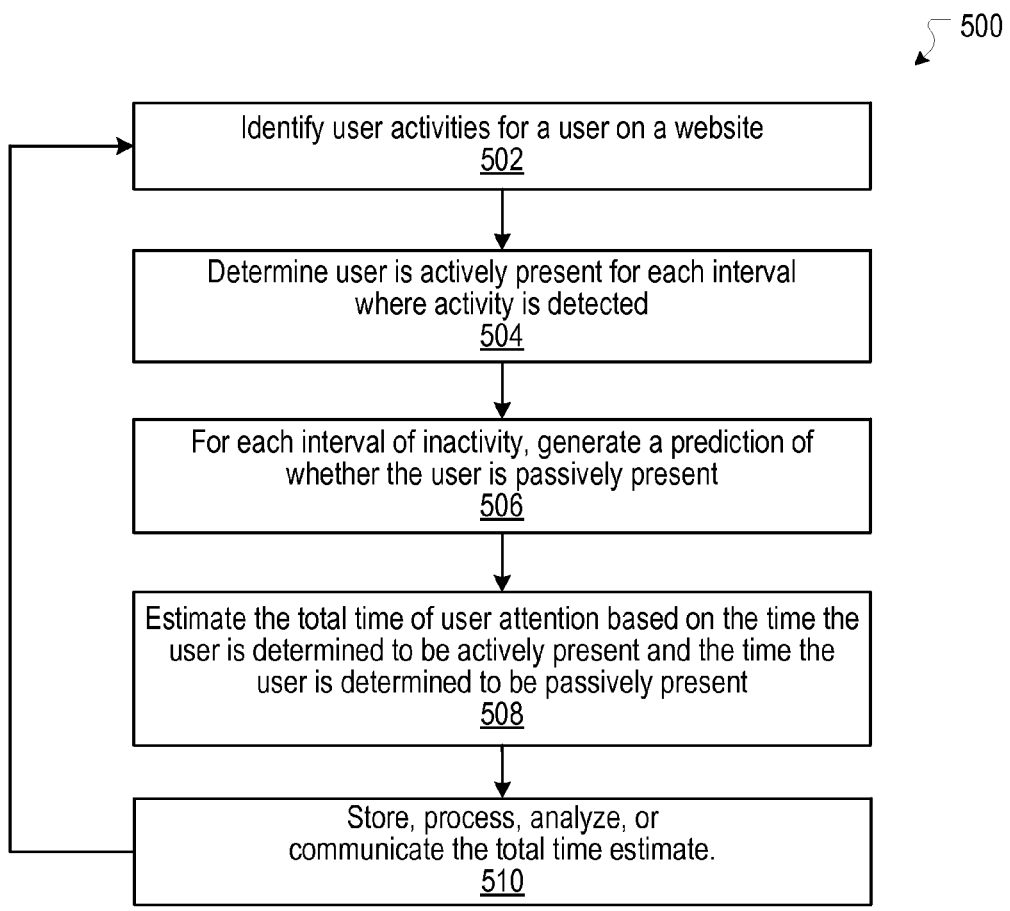
FIG. 5 illustrates an example method of estimating user attention on a website, according to an embodiment.

FIG. 5 illustrates an example method of estimating user attention on a website, according to an embodiment. At block 502 of method 500, user activities for a user on a website may be identified. The user activities may include various user activities as described herein that may be used to indicate when the user is actively present on the website. In an embodiment, the identification of the user activities may include monitoring the user activities of a user over a predetermined time period. The user activities may be recorded (e.g., in a bit array format as described herein) as they are monitored in real time. In another embodiment, the identification of the user activity may include receiving activity data that has been previously recorded (e.g., in a bit array format as described herein) by a remote device. The bit array may include a recorded sequence of "1"s and "0"s at a predetermined time interval (e.g., every second), where each bit value of "1" or "0" may represent either a detection or non-detection of a user activity, respectively, at each time interval. In an embodiment, block 502 may be performed by the activity identification module 102 of FIG. 1.

At block 504, a determination may be made that the user is actively present for each interval where user activity is detected. For example, in an embodiment, the estimating module 104 of FIG. 1 may estimate that the user is actively present for each interval of user activity identified by the activity identification module 102. In an embodiment, block 504 may be performed by the estimating module 104 of FIG. 1.

At block 506, a prediction of whether the user is passively present for each interval of inactivity is generated by a model. In an embodiment, the model is trained based on training data collected according to the method 400 of FIG. 4. The type of prediction provided (e.g., probability, score, metric, etc.) may vary in different embodiments. In one embodiment, the prediction is provided as a probability.

In an embodiment, the prediction may be generated based on input data, such as contextual information related to the user's interaction with the website. Example contextual information may include data related to the page of the website the user was visiting; the browser that was being used by the user; the type of client device that was being used by the user; the time of day or week, or other time segment during which the user interaction was occurring; demographic information of the user; etc.

In an embodiment, block 506 may be performed by the attention modeling module 106 of FIG. 1. For example, the estimating module 104 of FIG. 1 may query the attention modeling module 106 for each time interval where no user activity is detected, such as where "0"s are recorded in a bit array of the activity data identified by the activity identification module 102. The estimating module 104 may also provide input data, such as contextual information, to the attention modeling module 106 with each query. The attention modeling module 106 may generate a prediction of a user being passively present for the time interval associated with the query along with any associated input data. The prediction may be based on the time since the last activity was detected and any other input data that may be provided.

At block 508, the total time of user attention on the website is estimated based on the time that the user is determined to be actively present and the time the user is determined to be passively present. The time that the user is actively present may be determined based on the total time corresponding to the intervals where user activity is detected in the activity data. The time that the user is passively present may be determined based on the predictions generated for each interval of inactivity. The prediction may be a probability, score, metric, etc. In an embodiment, the probability that is generated for an interval of inactivity may translate to a time estimate that is a fraction of the time interval. For example, for a time interval of 1 second, a 50% probability that the user is passively present may generate a time estimate of ½ second (50% of the 1 second time interval). The time estimate may vary accordingly based on other probabilities and other lengths of time intervals. Similarly, other types of scores or metrics may be generated that can be similarly converted to time estimates. It should be appreciated that other conversion techniques may be implemented in other embodiments.

At block 510, the total time of user attention on the website, which includes the time the user is actively present and the time the user is passively present, may then be stored in memory, further processed or analyzed, communicated to a remote device, or conveyed or used in some other manner. In an embodiment, blocks 508 and 510 may be performed by the estimating module 104 of FIG. 1.

Social Networking System—Example Implementation

Figure 6:
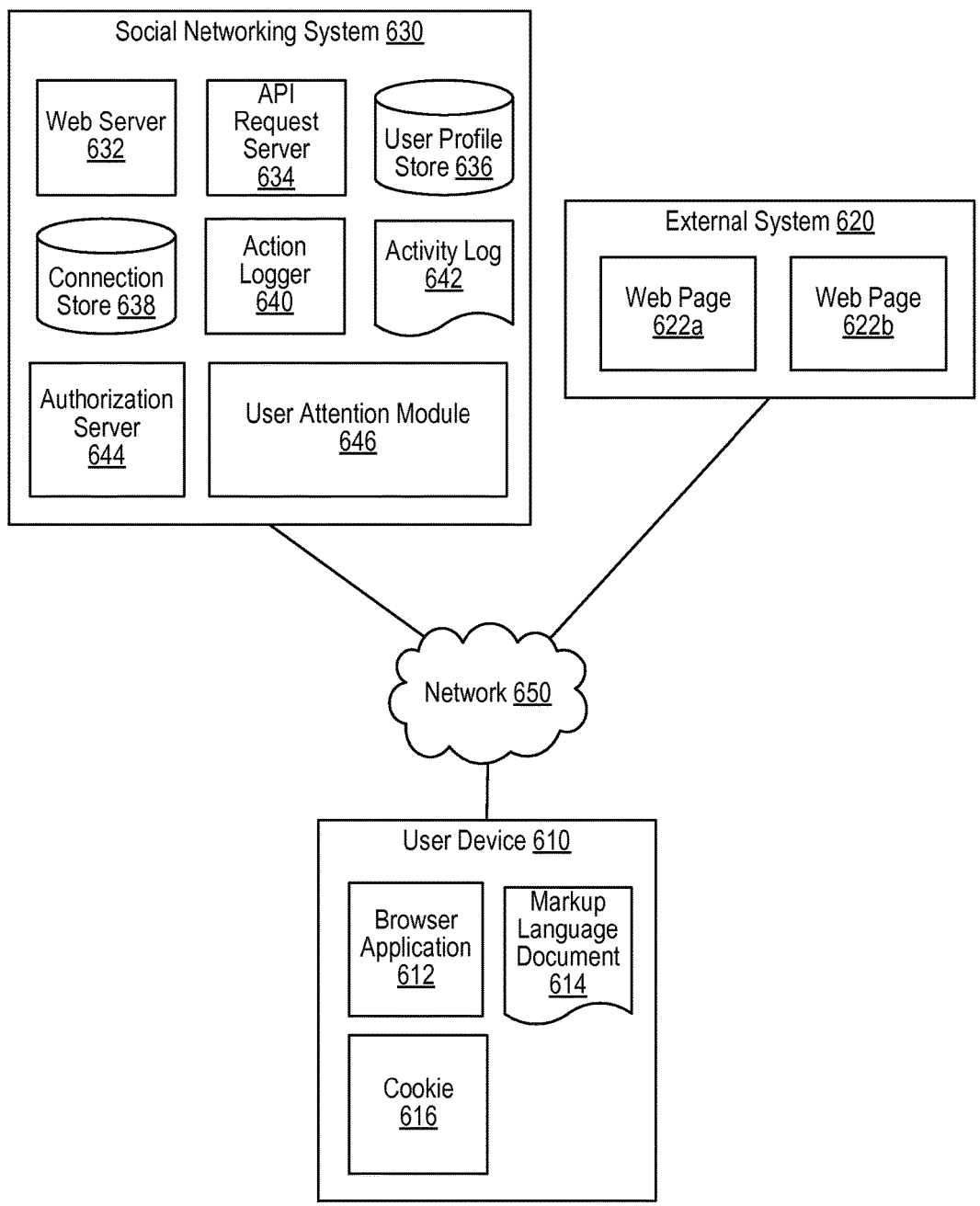
FIG. 6 illustrates a network diagram of a system for estimating user attention within a social networking system, according to an embodiment.

FIG. 6 is a network diagram of an example system 600 for estimating user attention on a website or application in accordance with an embodiment of the invention. The system 600 includes one or more user devices 610, one or more external systems 620, a social networking system 630, and a network 650. In an embodiment, the social networking system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two users.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, an authorization server 644, and a user attention module 646. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

The social networking system 630 may include a user attention module 646. The user attention module 646 may estimate how much time a user's attention is on a website. The user attention module 646 may base the estimate on the time that the user is determined to be actively present and the time the user is determined to be passively present. The user attention module 646 may base the estimate of the time the user is passively present on a prediction generated by a trained model. In an embodiment, the user attention module 646 may collect training data from a sample population to base the training of the model. In an embodiment, the user attention module 646 may be implemented as the user attention module 100 of FIG. 1.

Hardware Implementation

Figure 7:
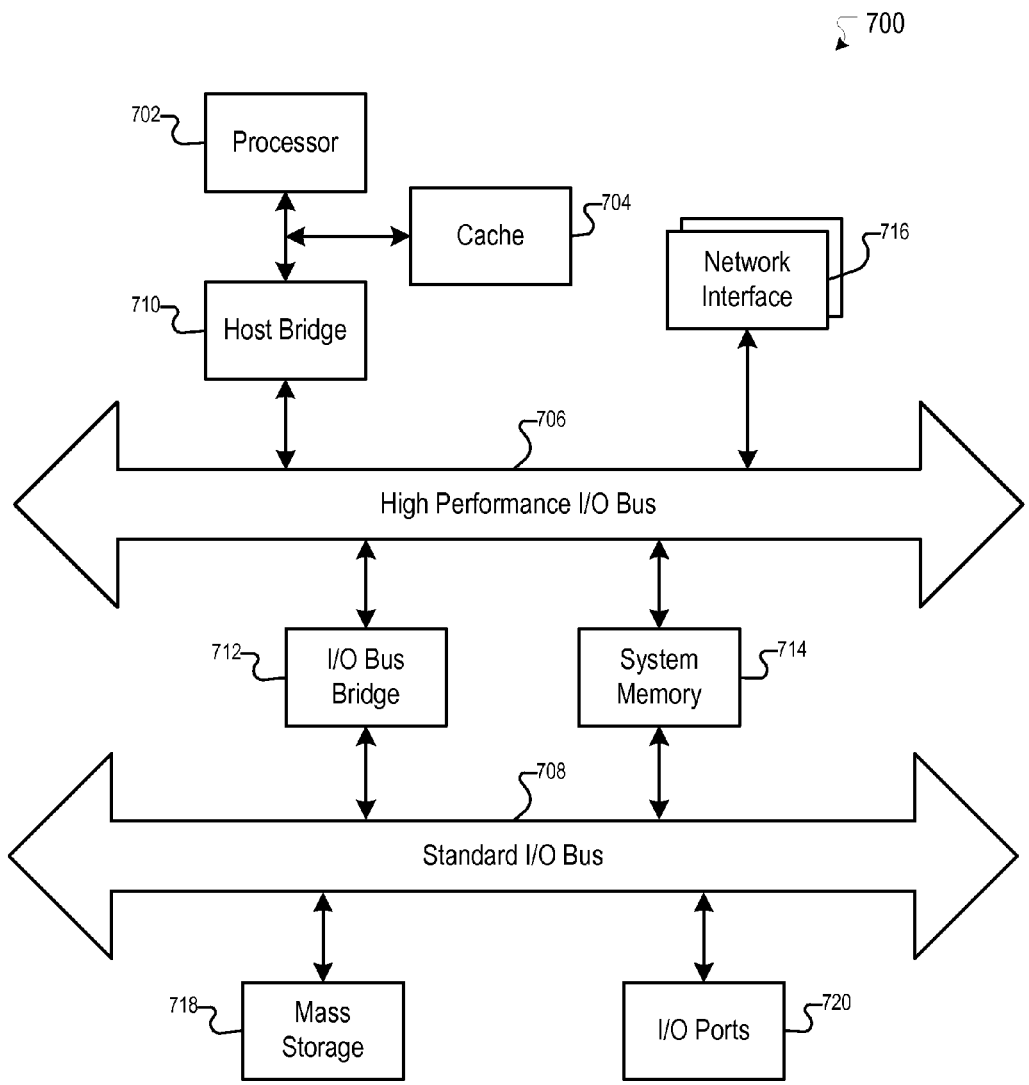
FIG. 7 illustrates an example of a computer system that may be used to implement one or more of the embodiments described herein, according to an embodiment.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be a component of the social networking system described herein. In an embodiment of the invention, the computer system 700 may be one server among many that constitutes all or part of the social networking system 730.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Furthermore, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:
1. A computer implemented method comprising:
identifying, by a computer system, first activity data for a first user of a website or an application, wherein the first activity data indicates activities of the first user on the website or the application, the website or the application associated with a window of a plurality of windows displayable on a device associated with the first user;
randomly selecting, by the computer system, a first predetermined period of inactivity from an exponential distribution, where the first predetermined period of inactivity is variable to constitute training data to train a machine learning model to predict whether users are passively present on the website or the application;
detecting, by the computer system, the first predetermined period of inactivity in the first activity data;
initiating, by the computer system, a response triggering event designed to trigger a user response from the first user after the first predetermined period of inactivity, wherein the response triggering event designed to trigger the user response is applied to the window associated with the website or the application;
monitoring, by the computer system, for an indication of the user response to the response triggering event, the user response relating to the window associated with the website or the application; and
determining, by the computer system, whether the first user is passively present on the website or the application associated with the window of the plurality of windows based on the monitoring for the indication of the user response to the response triggering event designed to trigger the user response.

2. The computer implemented method of claim 1, further comprising:
determining, by the computer system, the first user is present on the website or the application when the indication of the user response is detected within a threshold time period for response.

3. The computer implemented method of claim 2, wherein the first user is determined to be passively present on the website or the application at a time when the response triggering event is initiated.

4. The computer implemented method of claim 1, further comprising: determining, by the computer system, the first user is absent from the website or the application when the indication of the user response is not detected within a threshold time period for response.

5. The computer implemented method of claim 4, wherein the first user is determined to be absent from the website or the application at a time when the response triggering event is initiated.

6. The computer implemented method of claim 1, further comprising: logging, by the computer system, whether the first user is determined to be passively present on the website or the application.

7. The computer implemented method of claim 6, further comprising: logging, by the computer system, contextual information associated with the logging.

8. The computer implemented method of claim 7, wherein the contextual information comprises one or more of the following: a page of the website or the application the first user was on, a browser on which the website or the application was run, and an operating system of a device on which the website or the application was run.

9. The computer implemented method of claim 8, wherein the contextual information comprises one or more of the following: a type of client device, a time of day or week, and demographic information.

10. The computer implemented method of claim 1, wherein the response triggering event is a dimming of the website or the application.

11. The computer implemented method of claim 1, wherein the response triggering event is a displaying of a request for the first user to confirm whether the user is present on the website or the application.

12. The computer implemented method of claim 1, further comprising:
training, by the computer system, the model to predict whether users are passively present on the website or the application based at least in part on the determining whether the first user is passively present.

13. The computer implemented method of claim 12, wherein the model is a regression model.

14. The computer implemented method of claim 12, wherein the model is a threshold model.

15. The computer implemented method of claim 12, further comprising:
identifying, by the computer system, second activity data for a second user, wherein the second activity data indicates activities of the second user on the website or the application;
detecting, by the computer system, a first interval of inactivity in the second activity data;
generating, by the computer system, a prediction of whether the second user is passively present on the website or the application during the first interval of inactivity based on the model; and
estimating, by the computer system, a time the second user is passively present on the website or the application during the first interval of inactivity based on the prediction.

16. The computer implemented method of claim 15, wherein the prediction is a probability.

17. The computer implemented method of claim 15, wherein a total time the second user is determined to be on the website or the application comprises: the time the second user is passively present on the website or the application during the first interval of inactivity; and a time the second user is determined to be actively present on the website or the application.

18. The computer implemented method of claim 1, wherein the computer system includes a server associated with a social networking system.

19. A system comprising:
at least one processor; and
a memory storing instructions configured to instruct the at least one processor to perform:
identifying first activity data for a first user of a website or an application, wherein the first activity data indicates activities of the first user on the website or the application, the website or the application associated with a window of a plurality of windows displayable on a device associated with the first user;
randomly selecting a first predetermined period of inactivity from an exponential distribution, where the first predetermined period of inactivity is variable to constitute training data to train a machine learning model to predict whether users are passively present on the website or the application;
detecting the first predetermined period of inactivity in the first activity data based on the bit array;
initiating a response triggering event designed to trigger a user response from the first user after the first predetermined period of inactivity, wherein the response triggering event designed to trigger the user response is applied to the window associated with the website or the application;
monitoring for an indication of the user response to the response triggering event, the user response relating to the window associated with the website or the application; and
determining whether the first user is passively present on the website or the application associated with the window of the plurality of windows based on the monitoring for the indication of the user response to the response triggering event designed to trigger the user response.

20. A non-transitory computer storage medium storing computer-executable instructions that, when executed, cause a computer system to perform a computer-implemented method comprising:
identifying first activity data for a first user of a website or an application, wherein the first activity data indicates activities of the first user on the website or the application, the website or the application associated with a window of a plurality of windows displayable on a device associated with the first user;
randomly selecting a first predetermined period of inactivity from an exponential distribution, where the first predetermined period of inactivity is variable to constitute training data to train a machine learning model to predict whether users are passively present on the website or the application;

detecting the first predetermined period of inactivity in the first activity data based on the bit array;

initiating a response triggering event designed to trigger a user response from the first user after the first predetermined period of inactivity, wherein the response triggering event designed to trigger the user response is applied to the window associated with the website or the application;

monitoring for an indication of the user response to the response triggering event, the user response relating to the window associated with the website or the application; and determining whether the first user is passively present on the website or the application associated with the window of the plurality of windows based on the monitoring for the indication of the user response to the response triggering event designed to trigger the user response.

* * * * *